United States Patent
Anjuri et al.

(10) Patent No.: US 8,038,396 B2
(45) Date of Patent: Oct. 18, 2011

(54) VORTEX GENERATOR ASSEMBLY FOR USE WITH A WIND TURBINE ROTOR BLADE AND METHOD FOR ASSEMBLING A WIND TURBINE ROTOR BLADE

(75) Inventors: EswaraRao V S J Anjuri, Visakhapatnam (IN); Biju Nanukuttan, Jabalpur (IN); Jaikumar Loganathan, Bangalore (IN); Stefan Herr, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/820,760

(22) Filed: Jun. 22, 2010

(65) Prior Publication Data

US 2011/0142664 A1    Jun. 16, 2011

(51) Int. Cl.
*F01D 5/18*    (2006.01)
(52) U.S. Cl. .............. 416/1; 416/23; 416/61; 416/236 R
(58) Field of Classification Search ................ 416/1, 23, 416/24, 61, 142, 146 R, 235, 236 A, 236 R
See application file for complete search history.

(56) References Cited

U.S. PATENT DOCUMENTS

| | | | | |
|---|---|---|---|---|
| 5,058,837 A | * | 10/1991 | Wheeler | ............... 244/200.1 |
| 5,253,828 A | | 10/1993 | Cox | |
| 6,318,677 B1 | | 11/2001 | Dixon | |
| 6,427,948 B1 | * | 8/2002 | Campbell | ............... 244/204.1 |
| 6,491,260 B2 | | 12/2002 | Borchers et al. | |
| 6,837,465 B2 | * | 1/2005 | Lisy et al. | ............... 244/204.1 |
| 2006/0140760 A1 | | 6/2006 | Saddoughi et al. | |
| 2007/0086893 A1 | * | 4/2007 | Pedersen | ............... 416/61 |
| 2008/0317600 A1 | | 12/2008 | Enevoldsen et al. | |
| 2009/0016891 A1 | * | 1/2009 | Parsania et al. | ........... 416/223 R |
| 2010/0008787 A1 | | 1/2010 | Godsk | |

* cited by examiner

*Primary Examiner* — Edward Look
*Assistant Examiner* — Andrew C Knopp
(74) *Attorney, Agent, or Firm* — James McGinness Esq.; Armstrong Teasdale LLP (57) ABSTRACT

A method of manipulating a boundary layer across a wind turbine rotor blade. The method includes coupling at least one vortex generator to the rotor blade. The vortex generator includes at least one sidewall that extends outwardly a radial distance from an outer surface of the rotor blade. The vortex generator is selectively positionable between a first position and a second position. A control system calculates a condition of the boundary layer. The vortex generator is positioned at one of the first position and the second position based on the calculated condition of the boundary layer for moving the vortex generator between the first position and the second position.

20 Claims, 7 Drawing Sheets

VORTEX GENERATOR ASSEMBLY FOR USE WITH A WIND TURBINE ROTOR BLADE AND METHOD FOR ASSEMBLING A WIND TURBINE ROTOR BLADE

BACKGROUND OF THE INVENTION

The subject matter described herein relates generally to wind turbines and, more particularly, to a vortex generator assembly for use with a wind turbine rotor blade.

At least some known wind turbines include a nacelle fixed atop a tower, wherein the nacelle includes a rotor coupled to a generator through a shaft. In known rotor assemblies, a plurality of blades extend from the rotor. The blades are oriented such that wind passing over the blades turns the rotor and rotates the shaft, thereby driving the generator to generate electricity. As wind flows over an outer surface of the rotor blade, a boundary layer is formed over the outer surface that facilitates generating lift across the rotor blade.

At least some known rotor blades include a root portion that facilitates coupling the rotor blade to the hub. At least some known root portions include a cylindrically shaped outer surface. As wind flows over at least some known rotor blade root portions, the boundary layer separates from the rotor blade outer surface and reduces the lift across the rotor blade. This reduction in lift further reduces the overall aerodynamic efficiencies of the rotor blade, which results in a reduction in annual power production of the wind turbine.

BRIEF DESCRIPTION OF THE INVENTION

In one aspect, a method of manipulating a boundary layer across a wind turbine rotor blade is provided. The method includes coupling at least one vortex generator to the rotor blade. The vortex generator includes at least one sidewall that extends outwardly a radial distance from an outer surface of the rotor blade. The vortex generator is selectively positionable between a first position and a second position. A control system calculates a condition of the boundary layer. The vortex generator is positioned at one of the first position and the second position based on the calculated condition of the boundary layer.

In another aspect, a vortex generator assembly for use with a wind turbine rotor blade is provided. The wind turbine rotor blade has a leading edge and an axially spaced trailing edge. The vortex generator assembly includes at least one vortex generator that is coupled to the wind turbine rotor blade. The vortex generator includes at least one sidewall that extends outwardly a radial distance from an outer surface of the wind turbine rotor blade. The vortex generator is selectively positionable between a first position and a second position. A control system is operatively coupled to the at least one vortex generator for moving the vortex generator between the first position and the second position.

In yet another aspect, a wind turbine is provided. The wind turbine includes a tower, a nacelle coupled to the tower, a hub rotatably coupled to the nacelle, and at least one rotor blade coupled to the hub. The rotor blade has a leading edge and an axially spaced trailing edge. A vortex generator assembly is coupled to the rotor blade. The vortex generator assembly includes at least one vortex generator that is coupled to the rotor blade. The vortex generator includes at least one sidewall that extends outwardly a radial distance from an outer surface of the rotor blade. The vortex generator is selectively positionable between a first position and a second position. A control system is operatively coupled to the at least one vortex generator for moving the vortex generator between the first position and the second position.

DETAILED DESCRIPTION OF THE INVENTION

The embodiments described herein facilitate assembling a rotor blade that increases an annual energy production of a wind turbine. More specifically, the rotor blade described herein includes a vortex generator assembly that is selectively positionable within a boundary layer flowing over a rotor blade outer surface. The vortex generator assembly facilitates the formation of vortices within the boundary layer, which increases a momentum of the boundary layer thus mitigating a separation of the boundary layer from the rotor blade outer surface. The vortex generator assembly facilitates transferring momentum from a free stream region of the boundary layer to a separated region of the boundary layer to enable reattachment of the boundary layer wherein a laminar flow is developed adjacent the rotor blade outer surface. In addition, the vortex generator assembly may be positioned substantially flush with the rotor blade outer surface to facilitate reducing a drag across the rotor blade outer surface and to facilitate increasing the aerodynamic efficiency of the rotor blade. As used herein, the term "annual energy production" refers to the cumulative electrical energy produced by a wind turbine during a calendar year.

Figure 1:
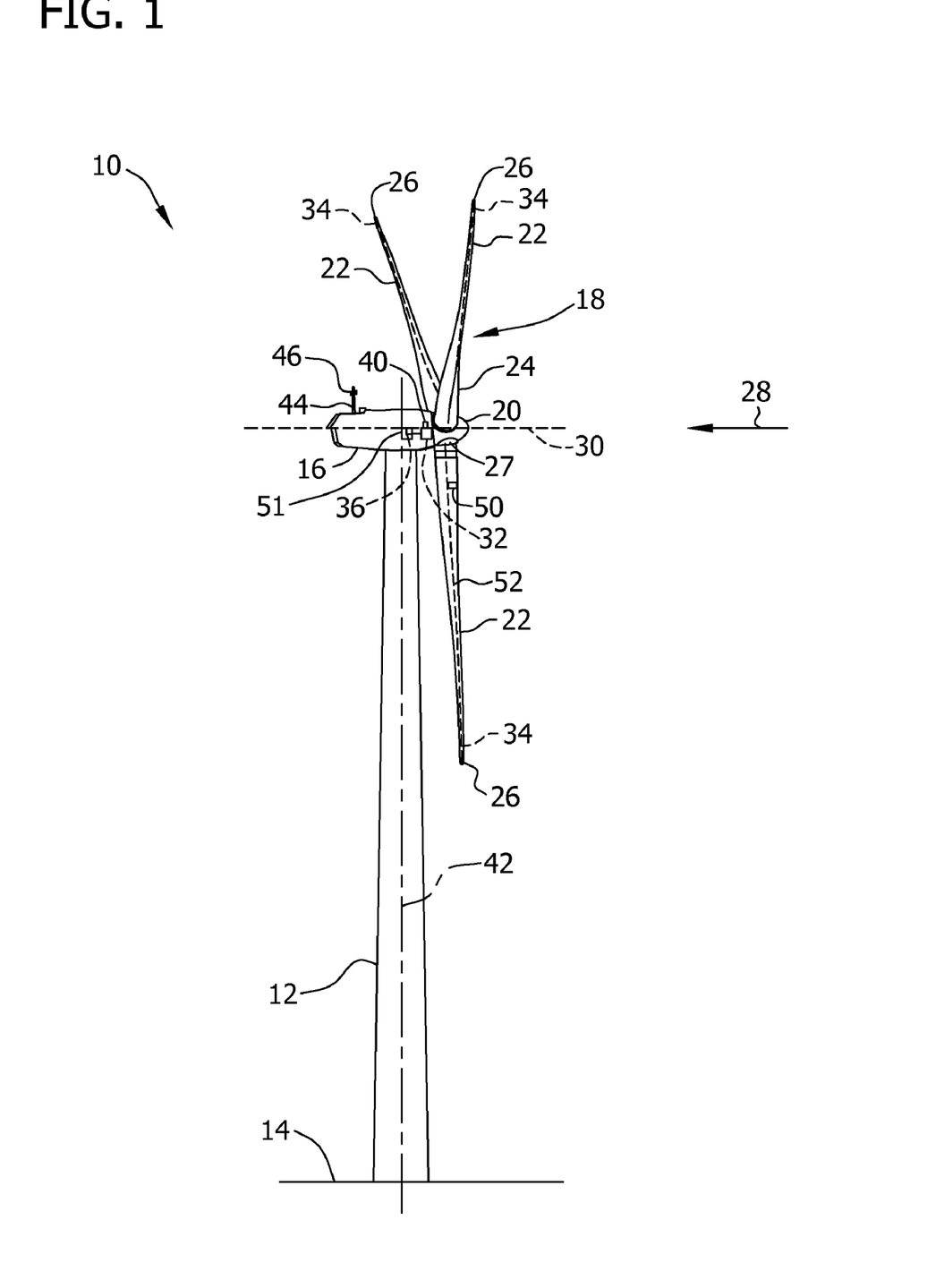
FIG. 1 is a perspective view of a portion of an exemplary wind turbine.

FIG. 1 is a perspective view of an exemplary wind turbine 10. In the exemplary embodiment, wind turbine 10 is a horizontal-axis wind turbine. Alternatively, wind turbine 10 may be a vertical-axis wind turbine. In the exemplary embodiment, wind turbine 10 includes a tower 12 that extends from a supporting surface 14, a nacelle 16 mounted on tower 12, and a rotor 18 that is rotatably coupled to nacelle 16. Rotor 18 includes a rotatable hub 20 and at least one rotor blade 22 coupled to and extending outward from hub 20. In the exemplary embodiment, rotor 18 has three rotor blades 22. In an alternative embodiment, rotor 18 includes more or less than three rotor blades 22. In the exemplary embodiment, tower 12 is fabricated from tubular steel such that a cavity (not shown in FIG. 1) is defined between supporting surface 14 and nacelle 16. In an alternative embodiment, tower 12 is any suitable type of tower having any suitable height.

Rotor blades 22 are spaced about hub 20 to facilitate rotating rotor 18. Rotor blades 22 include a blade root portion 24 and a blade tip portion 26, and are mated to hub 20 by coupling blade root portion 24 to hub 20 at a plurality of load transfer regions 27. Load transfer regions 27 have a hub load transfer region and a blade load transfer region (both not shown in FIG. 1). Loads induced to rotor blades 22 are transferred to hub 20 by load transfer regions 27.

In the exemplary embodiment, rotor blades 22 have a length ranging from about 30 meters (m) (99 feet (ft)) to about 120 m (394 ft). Alternatively, rotor blades 22 may have any suitable length that enables wind turbine 10 to function as described herein. For example, other non-limiting examples of blade lengths include 10 m or less, 20 m, and 37 m, or a length that is greater than 120 m. As wind strikes rotor blades 22 from a direction 28, rotor 18 is rotated about an axis of rotation 30. As rotor blades 22 are rotated and subjected to centrifugal forces, rotor blades 22 are also subjected to various forces and moments. As such, rotor blades 22 may deflect and/or rotate from a neutral, or non-deflected, position to a deflected position. A pitch adjustment system 32 rotates rotor blades 22 about a pitch axis 34 for adjusting an orientation of rotor blades 22 with respect to direction 28 of the wind. A speed of rotation of rotor 18 may be controlled by adjusting the orientation of at least one rotor blade 22 relative to wind vectors. In the exemplary embodiment, an angle of attack or pitch of each rotor blade 22 is controlled individually by a control system 36. As used herein, the term "angle of attack" refers to the orientation of a chordwise axis 38 (shown in FIG. 3) of rotor blade 22 relative to a wind inflow direction 39 (shown in FIG. 3). Alternatively, the blade pitch for all rotor blades 22 may be controlled simultaneously by control system 36. Pitch adjustment system 32 includes a sensor 40 for transmitting a signal indicative of an angle of attack of rotor blade 22 to control system 36. Further, in the exemplary embodiment, as direction 28 changes, a yaw direction of nacelle 16 may be controlled about a yaw axis 42 to position rotor blades 22 with respect to direction 28. Nacelle 16 also includes at least one meteorological mast 44 that includes a wind vane and a sensor 46 such as an anemometer. Sensor 46 is configured to sense a wind direction and/or a wind velocity of wind and transmit a signal indicative of wind direction 28 and/or the wind velocity to control system 36. A vortex generator assembly 50 is coupled to at least one rotor blade 22 to facilitate increasing the annual energy production of wind turbine 10. Control system 36 is operatively coupled to vortex generator assembly 50 to activate vortex generator assembly 50 during operation of wind turbine 10.

In the exemplary embodiment, control system 36 is shown as being centralized within nacelle 16, however, control system 36 may be a distributed system throughout wind turbine 10, on support surface 14, within a wind farm, and/or at a remote control center. Control system 36 includes a processor 51 configured to perform the methods and/or steps described herein. Further, many of the other components described herein include a processor. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein. It should be understood that a processor and/or a control system can also include memory, input channels, and/or output channels.

In the embodiments described herein, memory may include, without limitation, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, input channels include, without limitation, sensors and/or computer peripherals associated with an operator interface, such as a mouse and a keyboard. Further, in the exemplary embodiment, output channels may include, without limitation, a control device, an operator interface monitor, and/or a display.

Processors described herein process information transmitted from a plurality of electrical and electronic devices that may include, without limitation, sensors, actuators, compressors, control systems, and/or monitoring devices. Such processors may be physically located in, for example, a control system, a sensor, a monitoring device, a desktop computer, a laptop computer, a programmable logic controller (PLC) cabinet, and/or a distributed control system (DCS) cabinet. RAM and storage devices store and transfer information and instructions to be executed by the processor(s). RAM and storage devices can also be used to store and provide temporary variables, static (i.e., non-changing) information and instructions, or other intermediate information to the processor(s) during execution of instructions by the processor(s). Instructions that are executed may include, without limitation, wind turbine control system control commands. The execution of sequences of instructions is not limited to any specific combination of hardware circuitry and software instructions.

During operation of wind turbine 10, wind is channeled over an outer surface 52 of rotor blade 22 to form a boundary layer 54 (shown in FIG. 3) across rotor blade 22. Boundary layer 54 has a boundary layer height 56 extending outwardly from rotor blade outer surface 52. Boundary layer 54 includes a surface region 58 at or near outer surface 52 and a free stream region 60 defined outwardly with respect to outer surface 52 from surface region 58. Free stream region 60 has a momentum that is greater than a momentum of surface region 58. As a velocity of wind increases across rotor blade 22, an angle of attack increases causing an increase in pressure gradients between surface region 58 and free stream region 60 that may induce separation of boundary layer 54 from outer surface 52. As boundary layer 54 separates from outer surface 52, control system 36 operates to extend vortex generator assembly 50 outwardly from outer surface 52 and into boundary layer 54. Vortex generator assembly 50 is configured to facilitate the formation of vortices 62 downstream of vortex generator assembly 50 to impart a swirl upon wind to channel a flow of wind from free stream region 60 towards surface region 58. Vortices 62 facilitate transferring a momentum from free stream region 60 to surface region 58 to increase a momentum of boundary layer 54 and facilitate an attached flow within boundary layer 54.

Figure 2:
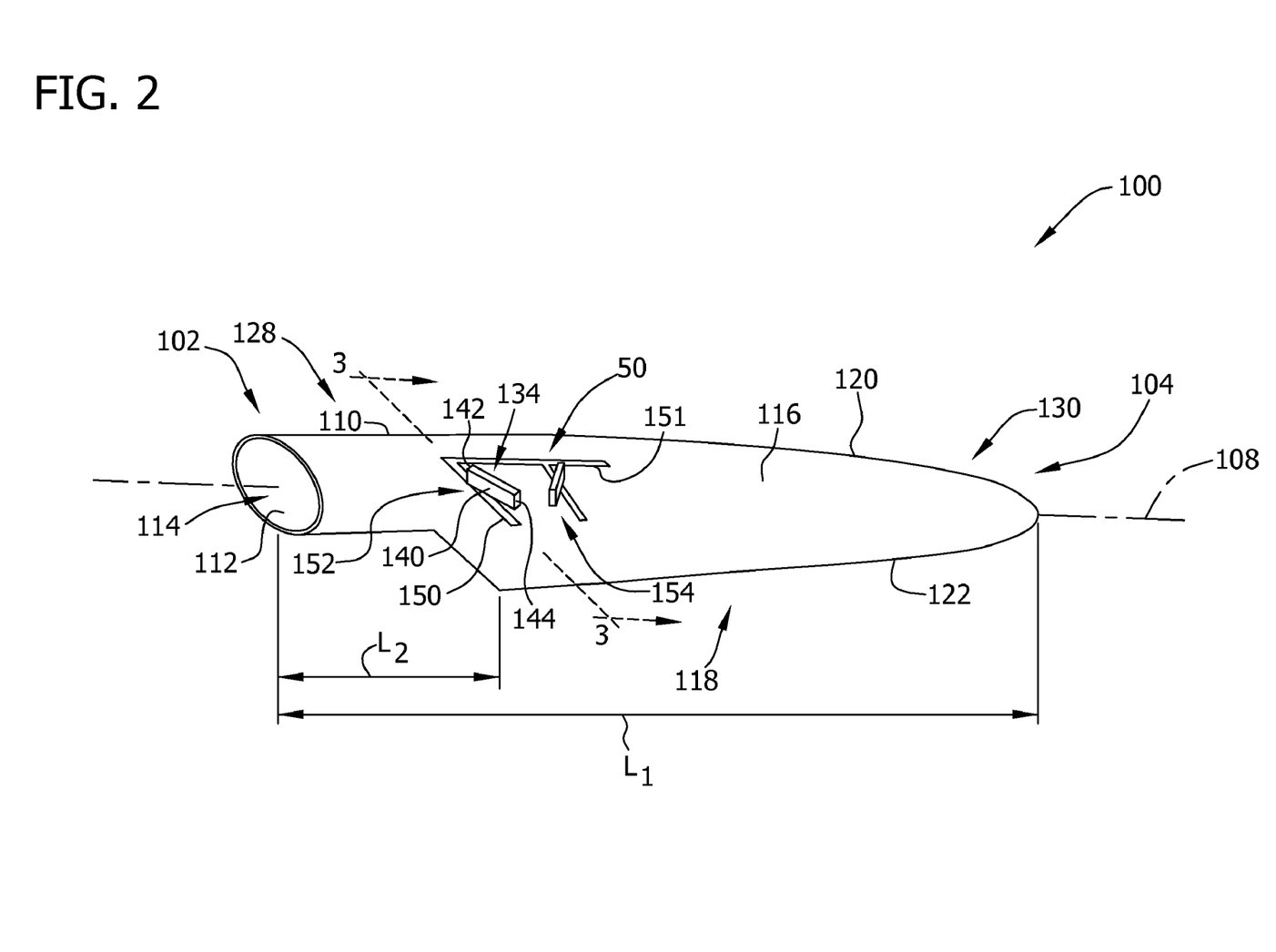
FIG. 2 is a perspective view of an exemplary rotor blade suitable for use with the wind turbine shown in FIG. 1.
Figure 3:
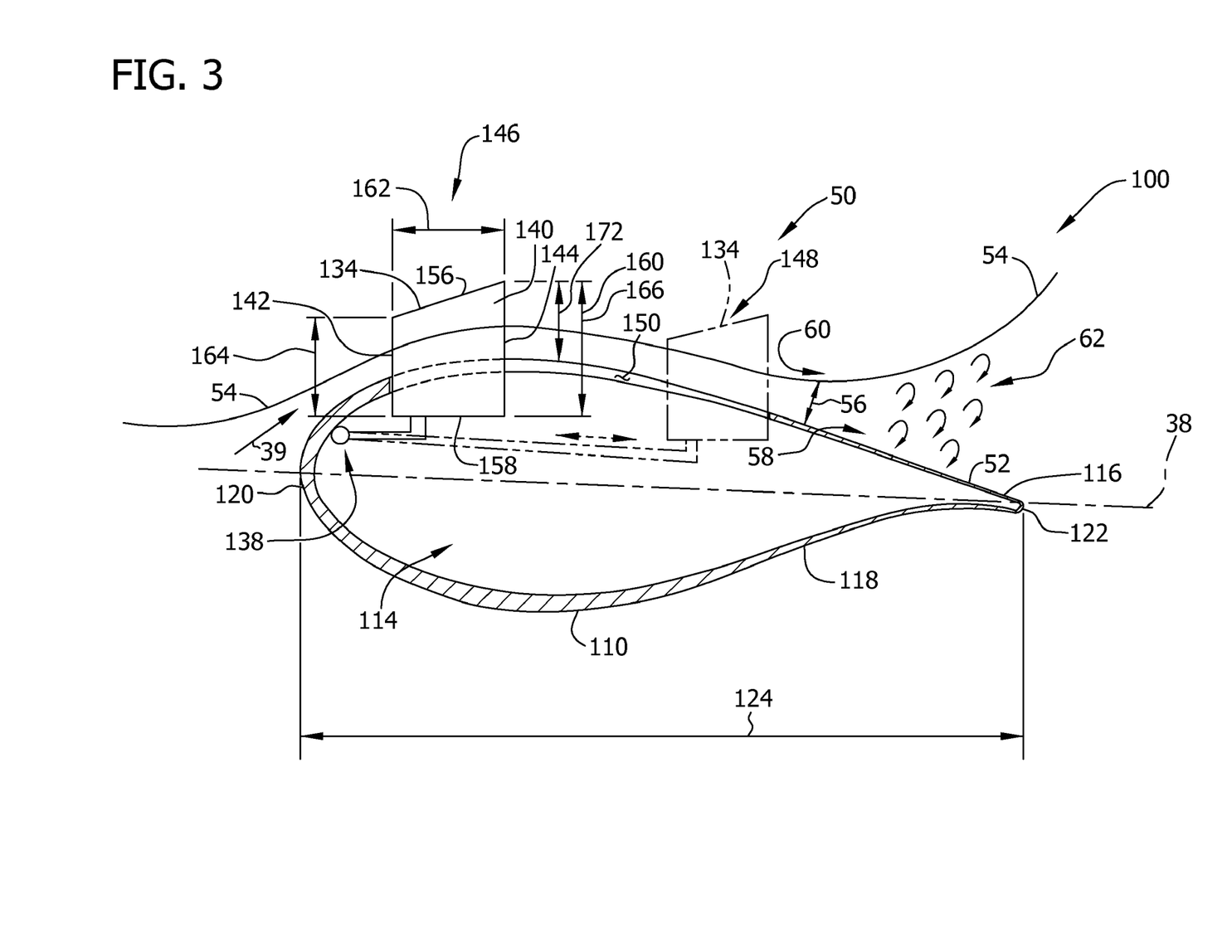
FIG. 3 is a cross-sectional view of the exemplary rotor blade shown in FIG. 2.
Figure 4:
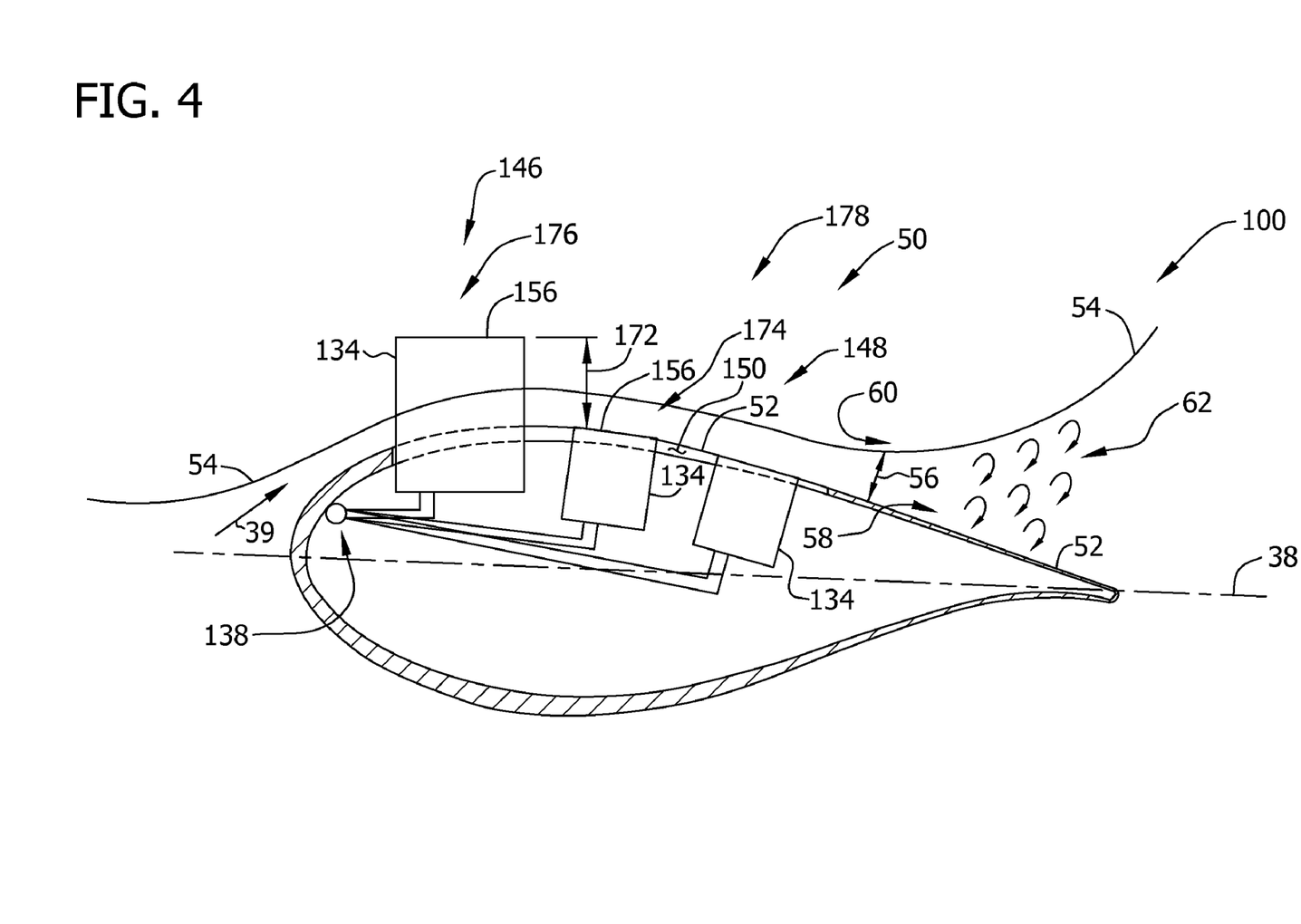
FIG. 4 is a cross-sectional view of an alternative vortex generator assembly suitable for use with the wind turbine shown in FIG. 1.
Figure 5:
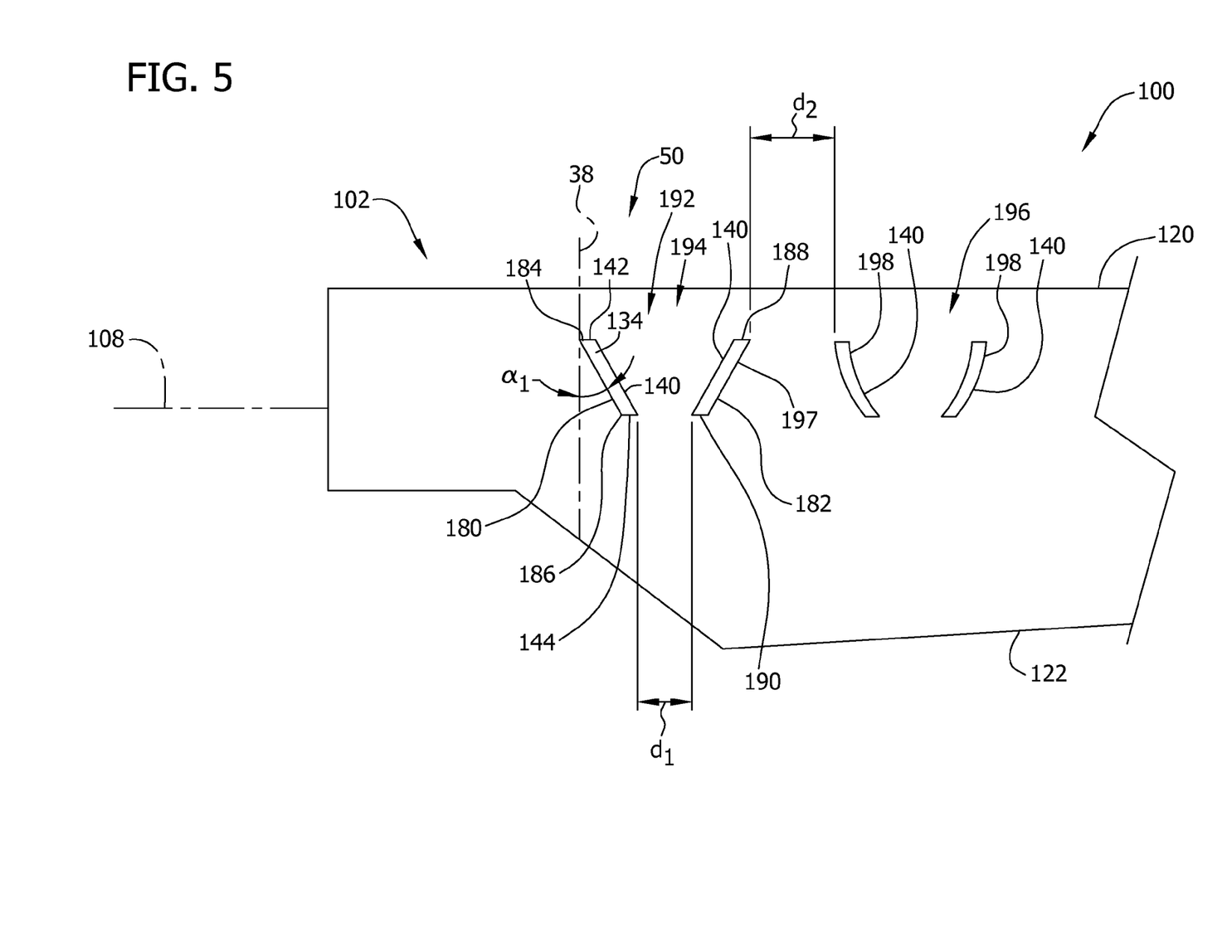
FIG. 5 is a top view of the exemplary rotor blade shown in FIG. 2.

FIG. 2 is a perspective view of an exemplary rotor blade 100 suitable for use with wind turbine 10. FIG. 3 is a cross-sectional view of rotor blade 100 at a chordwise sectional line 3-3 in FIG. 2. FIG. 4 is a cross-sectional view of an alternative embodiment of vortex generator assembly 50. FIG. 5 is a top view of rotor blade 100 shown in FIG. 2. Identical components shown in FIGS. 3-5 are identified with the same reference numbers used in FIG. 2. In the exemplary embodiment, rotor blade 100 includes a first or root portion 102 configured to facilitate mounting rotor blade 100 to hub 20 and a second or tip portion 104 opposing root portion 102. A blade sidewall 110 of rotor blade 100 extends between root portion 102 and tip portion 104 and along a longitudinal spanwise axis 108. Blade sidewall 110 has an inner surface 112 that at least partially defines a cavity 114 extending from root portion 102 towards tip portion 104. In the exemplary embodiment, blade sidewall 110 includes a first blade section 116, such as a suction side blade section, and an opposing second blade section 118, such as a pressure side blade section. In this embodiment, first blade section 116 is coupled to second blade section 118 along a leading edge 120 and an axially-spaced trailing edge 122. Rotor blade 100 has a chordwise width 124 extending along chordwise axis 38 defined between leading edge 120 and trailing edge 122. In the exemplary embodiment, rotor blade 100 includes an inboard portion 128 and an outboard portion 130 extending outwardly from inboard portion 128 along spanwise axis 108. At inboard portion 128, blade sidewall 110 has a substantially circular cross-sectional shape to facilitate coupling rotor blade 100 to hub 20 (shown in FIG. 1). At outboard portion 130, blade sidewall 110 has a substantially airfoil cross-sectional shape, such as shown in FIG. 3, from a transition point adjacent inboard portion 128 toward tip portion 104. In one embodiment, inboard portion 128 has a length $L_2$ that does not exceed about 30% of a longitudinal length $L_1$ of rotor blade 100 as measured from root portion 102 to tip portion 104. In an alternative embodiment, inboard portion length $L_2$ is greater than 30% of length $L_1$. As used herein, the term "longitudinal length" refers to a length of rotor blade 100 along longitudinal spanwise axis 108.

In the exemplary embodiment, vortex generator assembly 50 includes at least one vortex generator 134 coupled to first blade section 116 and an actuator 138 operatively coupled to vortex generator 134. Actuator 138 is configured to move vortex generator 134 with respect to outer surface 52. Vortex generator 134 includes at least one sidewall 140 extending between a leading portion 142 and a trailing portion 144 of sidewall 140. Leading portion 142 is positioned nearer to leading edge 120 than trailing edge 122 such that sidewall 140 extends from leading edge 120 towards trailing edge 122 along chordwise axis 38. Alternatively, vortex generator 134 may be coupled to second blade section 118 and/or first blade section 116.

In the exemplary embodiment, a plurality of first slots 150 are defined through first blade section 116 and extend along chordwise axis 38. Vortex generator 134 is positioned within inboard portion 128 and is at least partially inserted within a first slot 150. Vortex generator 134 is movable within first slot 150 and is selectively positionable between a first chordwise position 146 (shown in FIG. 3) and a second chordwise position 148 (shown in phantom lines in FIG. 3) along chordwise axis 38. First chordwise position 146 is nearer to leading edge 120 than second chordwise position 148. In one embodiment, vortex generator 134 is positionable between about 10 percent of chordwise width 124 to about 30 percent chordwise width 124 as measured from leading edge 120 towards trailing edge 122. In an alternative embodiment, vortex generator 134 is positionable along a full width of chordwise width 124 from leading edge 120 to trailing edge 122.

In one embodiment, a plurality of second slots 151 are defined through first blade section 116 and extend along spanwise axis 108 from at least one first slot 150 towards tip portion 104. Vortex generator 134 is further configured to be movable within second slot 151 and is selectively positionable between a first spanwise position 152 and a second spanwise position 154 (shown in FIG. 2) along spanwise axis 108. First spanwise position 152 is nearer to root portion 102 than second spanwise position 154. In one embodiment, actuator 138 is positioned within cavity 114 and is coupled to vortex generator 134 to facilitate positioning vortex generator 134 between first chordwise position 146 and second chordwise position 148, and between first spanwise position 152 and second spanwise position 154.

Referring further to FIG. 3, in the exemplary embodiment, vortex generator sidewall 140 extends between an upper surface 156 and a lower surface 158, and has a height 160 measured from lower surface 158 to upper surface 156. Sidewall 140 has a length 162 measured between leading portion 142 and trailing portion 144. In one embodiment, length 162 is equal to between about 2 times height 160 to about 4 times height 160. Leading portion 142 has a leading or first radial height 164 extending between lower surface 158 and upper surface 156. Trailing portion 144 has a trailing or second radial height 166 extending radially between lower surface 158 and upper surface 156. In one embodiment, vortex generator 134 has leading radial height 164 that is less than trailing radial height 166 such that vortex generator 134 has a trapezoidal ratio defined as a ratio of leading radial height 164 divided by trailing radial height 166 of between about 0.1 and 1. In one embodiment, the trapezoidal ratio is substantially equal to 1.

In the exemplary embodiment, vortex generator sidewall 140 extends radially outwardly from blade sidewall 110 and with respect to axis 108 such that upper surface 156 extends a radial distance 172 from outer surface 52. Sidewall 140 is oriented substantially perpendicularly to outer surface 52. In an alternative embodiment, sidewall 140 is oriented substantially obliquely from outer surface 52. In the exemplary embodiment, vortex generator 134 is selectively positionable such that upper surface 156 is substantially flush with outer surface 52 or positioned at a radial distance 172 of about 3.0 times boundary layer height 56. Vortex generator 134 is selectively positionable between a first radial position 174 (shown in FIG. 4) and a second radial position 176 (shown in FIG. 4). In first radial position 174, upper surface 156 is positioned substantially flush with outer surface 52. In second radial position 176, upper surface 156 is positioned at radial distance 172 equal to about 0.1 to about 5.0 times boundary layer height 56.

Referring to FIG. 4, in an alternative embodiment, vortex generator assembly 50 includes a plurality of vortex generators 134 aligned in a row 178 oriented along the chordwise axis 38 extending between first chordwise position 146 and second chordwise position 148. Control system 36 is configured to selectively activate each vortex generator 134 and position each vortex generator 134 at first radial position 174 or second radial position 176 based on boundary layer height 56.

Referring to FIG. 5, in the exemplary embodiment, vortex generator sidewall 140 is oriented obliquely from chordwise axis 38 to define an angle $\alpha_1$ between sidewall 140 and chordwise axis 38. Sidewall 140 is rotatable about leading portion 142 such that trailing portion 144 rotates about leading portion 142. In the exemplary embodiment, vortex generator 134 is selectively rotatable such that angle $\alpha_1$ is from about 0 degrees to about 30 degrees with respect to chordwise axis 38, and in certain embodiments, $\alpha_1$ is between about 10 degrees to about 20 degrees with respect to chordwise axis 38.

In the exemplary embodiment, vortex generator assembly 50 includes a first vortex generator 180 and a second vortex generator 182. First vortex generator 180 and second vortex generator 182 each has height 160 (shown in FIG. 3). First vortex generator 180 is positioned nearer root portion 102 than second vortex generator 182. First vortex generator 180 has a leading portion 184 and a trailing portion 186. Second vortex generator 182 has a leading portion 188 and a trailing portion 190. First vortex generator 180 is positioned relative to second vortex generator 182 such that a distance $d_1$ is defined between trailing portion 186 and trailing portion 190. In one embodiment, distance $d_1$ is equal to between about 1 times height 160 and about 6 times height 160.

In the exemplary embodiment, first vortex generator 180 and second vortex generator 182 are oriented to converge towards each other from leading edge 120 to trailing edge 122. In an alternative embodiment, first vortex generator 180 and second vortex generator 182 are oriented to diverge away from each other from leading edge 120 to trailing edge 122. In another alternative embodiment, first vortex generator 180 and second vortex generator 182 are oriented parallel to each other.

In one embodiment, first vortex generator 180 and second vortex generator 182 form a vortex set 192. In this embodiment, vortex generator assembly 50 includes a first vortex set 194 and at least one second vortex set 196. First vortex set 194 is positioned nearer to root portion 102 than second vortex set 196 such that a vortex set distance $d_2$ is defined between first vortex set 194 and second vortex set 196. In the exemplary embodiment, vortex set distance $d_2$ is equal to between about 1 times distance $d_1$ and about 8 times distance $d_1$.

In one embodiment, vortex generator 134 is formed of a shape memory alloy. As used herein, the term "shape memory alloy" includes metals that are configured to change shape, stiffness, position, natural frequency, and other mechanical characteristics in response to a temperature or an electromagnetic field. Examples of shape memory alloys include, but are not limited to, nickel-titanium alloys, copper-aluminum-nickel alloys, copper-zinc-aluminum, and iron-manganese-silicon alloys. In the exemplary embodiment, vortex generator 134 is activated between an extended state at second radial position 176 and a retracted state at first radial position 174. During operation of wind turbine 10, control system 36 operates actuator 138 to move vortex generator 134 between the extended state and the retracted state. In the exemplary embodiment, actuator 138 operates to facilitate selectively increasing an electrical current channeled through vortex generator 134 to facilitate increasing an electrical resistance and/or a temperature of vortex generator 134 to change the mechanical characteristics of vortex generator 134.

In an alternative embodiment, during operation of vortex generator assembly 50, control system 36 operates actuator 138 to increase a resistance across vortex generator 134 to change a shape of vortex generator 134 from a first cross-sectional shape 197 to a second cross-sectional shape 198 that is different from first cross-sectional shape 197. In one embodiment, first cross-sectional shape 197 includes a substantially planar sidewall 140, and second cross-sectional shape 198 includes a substantially arcuate sidewall 140, such as a concave or convex sidewall 140.

Figure 6:
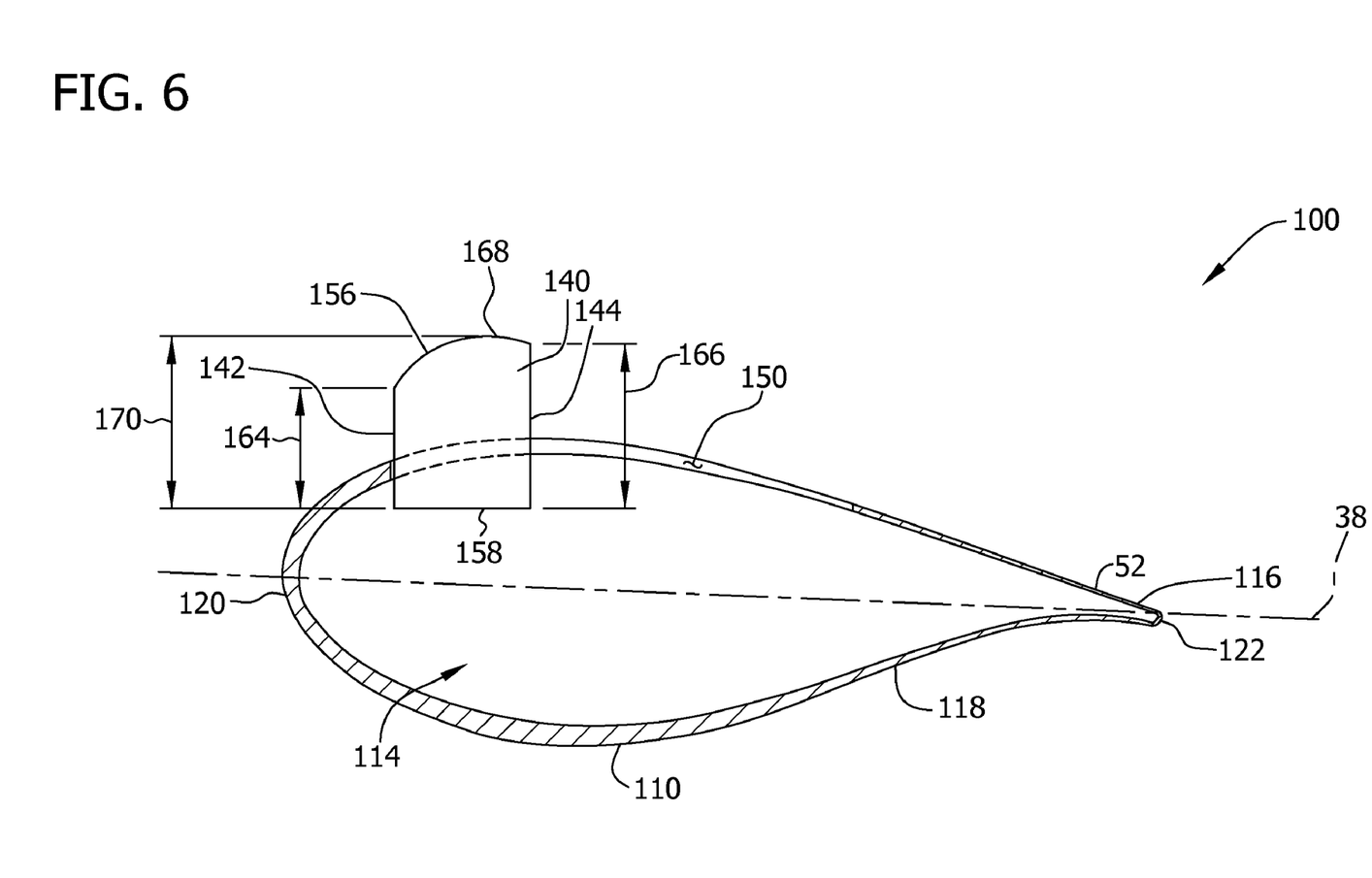
FIG. 6 is a cross-sectional view of an alternative vortex generator suitable for use with the wind turbine shown in FIG. 1.

FIG. 6 is a cross-sectional view of an alternative embodiment of vortex generator 134. Identical components shown in FIG. 6 are identified with the same reference numbers used in FIG. 3. In the alternative embodiment, upper surface 156 extends arcuately from leading portion 142 to trailing portion 144. In a further alternative, upper surface 156 has a middle section 168 that extends a radial height 170 that is greater than leading radial height 164 and trailing radial height 166.

Figure 7:
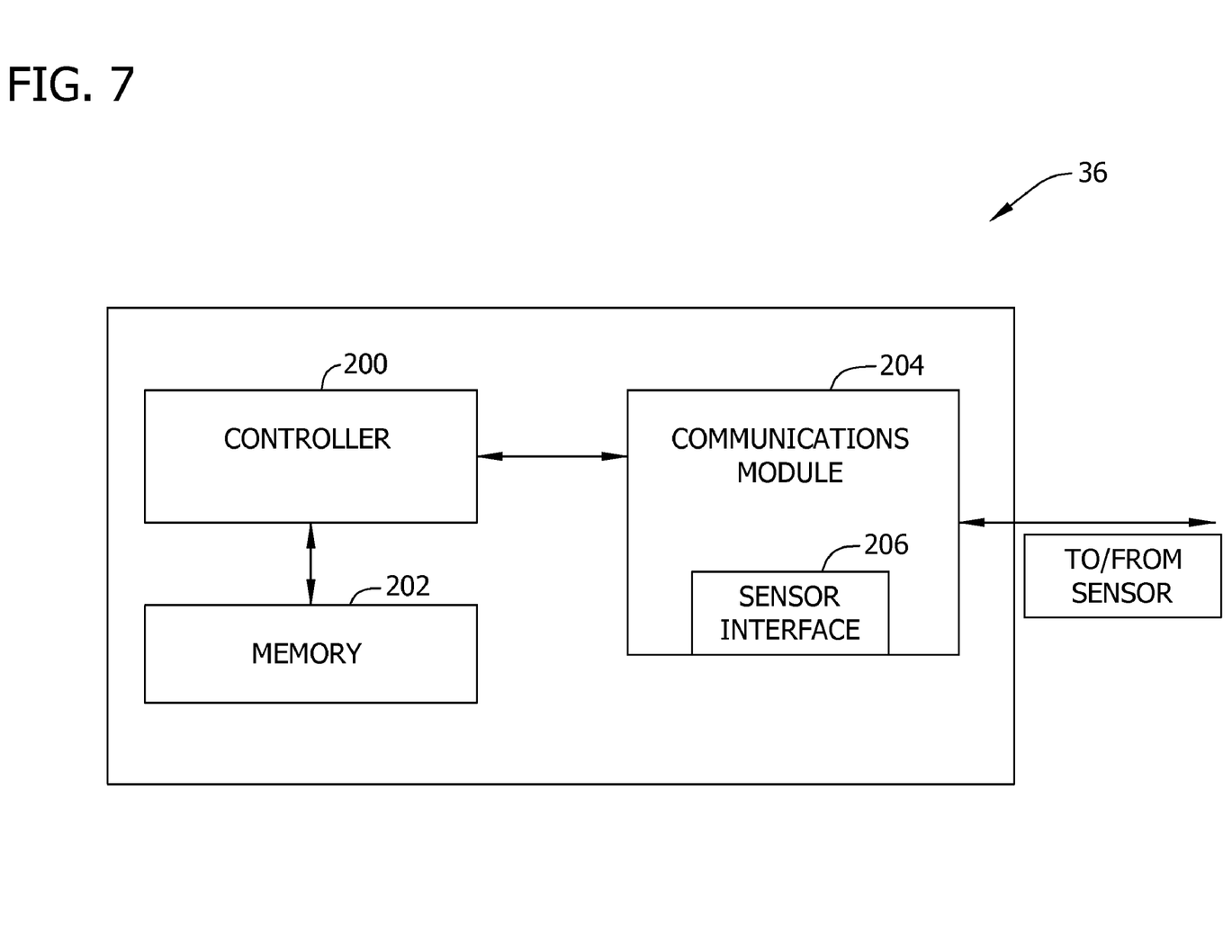
FIG. 7 is a block diagram of an exemplary control system suitable for use with the wind turbine shown in FIG. 1.

FIG. 7 is a block diagram of exemplary control system 36. In the exemplary embodiment, control system 36 includes a controller 200, a memory 202, and a communications module 204. Control system 36 may include any suitable device that enables control system 36 to function as described herein. In the exemplary embodiment, communications module 204 includes a sensor interface 206 that facilitates enabling controller 200 to communicate with at least one sensor mounted at any suitable location on or within, or outside wind turbine 10. In one embodiment, sensor interface 206 includes an analog-to-digital converter that converts an analog voltage signal generated by the sensor to a multi-bit digital signal usable by controller 200. In alternative embodiments, communications module 204 may include any suitable wired and/or wireless communications device that facilitates transmitting signals to and/or receiving signals from any device located on or within, or outside wind turbine 10 and/or remotely from wind turbine 10. In the exemplary embodiment, memory 202 may include any suitable storage device, including, but not limited to, flash memory, electronically erasable programmable memory, read only memory (ROM), removable media, and/or other volatile and non-volatile storage devices. In one embodiment, executable instructions (i.e., software instructions) are stored in memory 202 for use by controller 200 in controlling vortex generator assembly 50 as described below.

In the exemplary embodiment, controller 200 is a real-time controller that includes any suitable processor-based or microprocessor-based system, such as a computer system, that includes microcontrollers, reduced instruction set circuits (RISC), application-specific integrated circuits (ASICs), logic circuits, and/or any other circuit or processor that is capable of executing the functions described herein. In one embodiment, controller 200 is a microprocessor that includes read-only memory (ROM) and/or random access memory (RAM), such as, for example, a 32 bit microcomputer with 2 Mbit ROM, and 64 Kbit RAM. As used herein, the term "real-time" refers to outcomes occurring at a substantially short period of time after a change in the inputs affect the outcome, with the time period being a design parameter that may be selected based on the importance of the outcome and/or the capability of the system processing the inputs to generate the outcome.

During operation of wind turbine 10, controller 200 receives from sensor 46 signals indicative of a velocity of wind and receives from sensor 40 signals indicative of an angle of attack or pitch of rotor blade 22. Controller 200 is configured to calculate a condition of boundary layer 54 above rotor blade 22 based on a velocity of wind and the angle of attack of rotor blade 22. Controller 200 is further configured to position vortex generator 134 based at least in part on the calculated condition of boundary layer 54 to facilitate manipulating boundary layer 54. In one embodiment, controller 200 is configured to calculate a height of boundary layer 54 above rotor blade 22 based on a velocity of wind and the angle of attack of rotor blade 22. In another embodiment, controller 200 is configured to calculate a differential momentum between a momentum of free stream region 60 and a momentum of surface region 58. In such an embodiment, controller 200 is configured to compare the calculated differential momentum to a predefined momentum to determine if flow separation of boundary layer 54 from rotor blade 22 has occurred. If a flow separation has occurred, controller 200 operates vortex generator assembly 50 to position vortex generator 134 within boundary layer 54 to facilitate the formation of vortices 62 to facilitate attaching boundary layer 54 to outer surface 52. If controller 200 determines a flow separation has not occurred and boundary layer 54 is attached to outer surface 52, controller 200 operates vortex generator assembly 50 to position vortex generator 134 substantially flush with outer surface 52 such that vortex generator 134 is not positioned within boundary layer 54, thus reducing a drag of rotor blade 22.

The above-described systems and methods facilitate assembling a rotor blade that includes a vortex generator assembly that facilitates increasing an annual energy production of the wind turbine. More specifically, the rotor blade described herein includes a vortex generator assembly that is selectively positionable within a boundary layer formed over an outer surface of the rotor blade. Moreover, the vortex generator assembly facilitates the formation of vortices within the boundary layer to facilitate attachment of the boundary layer to the rotor blade. In addition, by providing a vortex generator assembly, a rotor blade may be assembled that facilitates reducing the overall operating costs of the wind turbine by increasing the aerodynamic efficiency of the rotor blade.

Exemplary embodiments of a vortex generator assembly for use with a wind turbine rotor blade and a method for assembling the rotor blade are described above in detail. The assemblies and method are not limited to the specific embodiments described herein, but rather, components of the assembly and/or steps of the method may be utilized independently and separately from other components and/or steps described herein. For example, the method may also be used in combination with other rotor blade systems and methods, and are not limited to practice with only the wind turbine assemblies as described herein. Rather, the exemplary embodiment can be implemented and utilized in connection with many other rotor blade applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of manipulating a boundary layer across a wind turbine rotor blade, said method comprising:
    coupling at least one vortex generator to the rotor blade, the vortex generator including at least one sidewall extending outwardly a radial distance from an outer surface of the rotor blade, the vortex generator selectively positionable between a first position and a second position;
    transmitting, from a sensor to a control system, a first signal indicative of an angle of attack of the rotor blade;
    calculating, by the control system, a condition of the boundary layer based at least in part on the received first signal; and,
    positioning the vortex generator at one of the first position and the second position based on the calculated condition of the boundary layer.

2. A method in accordance with claim 1, further comprising:
    transmitting a second signal indicative of a velocity of wind across the rotor blade; and,
    calculating the condition of the boundary layer based at least in part on the first signal and the second signal.

3. A method in accordance with claim 2, further comprising
    calculating a differential momentum of the boundary layer based at least in part on the first signal and the second signal;
    determining whether a flow separation has occurred based on the calculated differential momentum; and,
    positioning the vortex generator at one of the first position and the second position based on the determination of whether a flow separation has occurred.

4. A method in accordance with claim 1, wherein a chordwise axis is defined between a leading edge and a trailing edge of the rotor blade, said method further comprising positioning the vortex generator at one of a first chordwise position and a second chordwise position along the chordwise axis based on the calculated condition of the boundary layer, the first chordwise position nearer the leading edge than the second chordwise position.

5. A method in accordance with claim 1, wherein a spanwise axis is defined between a root portion and a tip portion of the rotor blade, said method further comprising positioning the vortex generator at one of a first spanwise position and a second spanwise position along the spanwise axis based on the calculated condition of the boundary layer, the first spanwise position nearer the root portion than the second spanwise position.

6. A method in accordance with claim 1 further comprising positioning the vortex generator at one of a first radial distance and a second radial distance based on the calculated condition of the boundary layer.

7. A vortex generator assembly for use with a wind turbine rotor blade, the wind turbine rotor blade having a leading edge and an axially spaced trailing edge, said vortex generator assembly comprising:
    at least one vortex generator coupled to the wind turbine rotor blade, said vortex generator comprising at least one sidewall extending outwardly a radial distance from an outer surface of the wind turbine rotor blade, said vortex generator selectively positionable between a first position and a second position;
    an actuator coupled to the at least one vortex generator, said actuator configured to position said at least one vortex generator between the first position and the second position;
    a sensor configured to sense an angle of attack of the rotor blade; and,
    a control system operatively coupled to said at least one vortex generator, said control system configured to move said vortex generator between the first position and the second position based at least in part on the sensed rotor blade angle of attack.

8. A vortex generator assembly in accordance with claim 7, wherein said at least one vortex generator is selectively positionable between a first radial distance and a second radial distance.

9. A vortex generator assembly in accordance with claim 7, wherein the wind turbine rotor blade has a chordwise axis defined between the leading edge and the trailing edge, said at least one vortex generator selectively movable between a first chordwise position and a second chordwise position along the chordwise axis, said first chordwise position nearer to the leading edge than said second chordwise position.

10. A vortex generator assembly in accordance with claim 7, wherein the wind turbine rotor blade has a spanwise axis defined between a root portion and a tip portion, said at least one vortex generator selectively movable between a first spanwise position and a second spanwise position along the spanwise axis, said first spanwise position nearer to the root portion than said second spanwise position.

11. A vortex generator assembly in accordance with claim 7, wherein said sidewall extends between a leading portion and a trailing portion, said leading portion positioned nearer the leading edge than said trailing portion, said trailing portion rotatable about said leading portion.

12. A vortex generator assembly in accordance with claim 7, wherein said at least one vortex generator comprises a shape memory alloy.

13. A vortex generator assembly in accordance with claim 7, further comprising a first vortex generator and a second vortex generator positioned outboard from said first vortex generator, said first vortex generator converging towards said second vortex generator from the leading edge towards the trailing edge.

14. A vortex generator assembly in accordance with claim 7, wherein said sidewall extends from a leading portion to a trailing portion, said trailing portion having a radial height that is greater than a radial height of said leading portion.

15. A wind turbine, comprising:
a tower;
a nacelle coupled to said tower;
a hub rotatably coupled to said nacelle;
at least one rotor blade coupled to said hub, said rotor blade having a leading edge and an axially spaced trailing edge; and,
a vortex generator assembly coupled to said rotor blade, said vortex generator assembly comprising:
at least one vortex generator coupled to said rotor blade, said vortex generator comprising at least one sidewall extending outwardly a radial distance from an outer surface of said rotor blade, said vortex generator selectively positionable between a first position and a second position;
a first sensor configured to sense an angle of attack of said at least one rotor blade; and,
a control system operatively coupled to said at least one vortex generator, said control system configured to move said vortex generator between said first position and said second position based at least in part on the sensed rotor blade angle of attack.

16. A wind turbine in accordance with claim 15, wherein said rotor blade has a chordwise axis defined between said leading edge and said trailing edge, said at least one vortex generator selectively movable between a first chordwise position and a second chordwise position along the chordwise axis, said first chordwise position nearer to said leading edge than said second chordwise position.

17. A wind turbine in accordance with claim 15, wherein said rotor blade has a spanwise axis defined between a root portion and a tip portion, said at least one vortex generator selectively movable between a first spanwise position and a second spanwise position along the spanwise axis, said first spanwise position nearer to said root portion than said second spanwise position.

18. A wind turbine in accordance with claim 15, wherein said vortex generator comprises a shape memory alloy.

19. A wind turbine in accordance with claim 15, wherein said at least one vortex generator is selectively positionable between a first radial distance and a second radial distance.

20. A wind turbine in accordance with claim 19, further comprising a second sensor coupled to said wind turbine and configured to sense a velocity of wind channeled over an outer surface of said rotor blade and to transmit a signal indicative of the sensed wind speed to said control system, said control system configured to calculate a height of a boundary layer extending from said blade outer surface based on the received signal, said control system further configured to position said vortex generator at one of said first radial distance and said second radial distance based on the calculated height of the boundary layer.

* * * * *